Dec. 8, 1953   J. W. FRENCH   2,661,657
BINOCULAR OBSERVATION INSTRUMENT
Filed Aug. 15, 1947   5 Sheets-Sheet 1
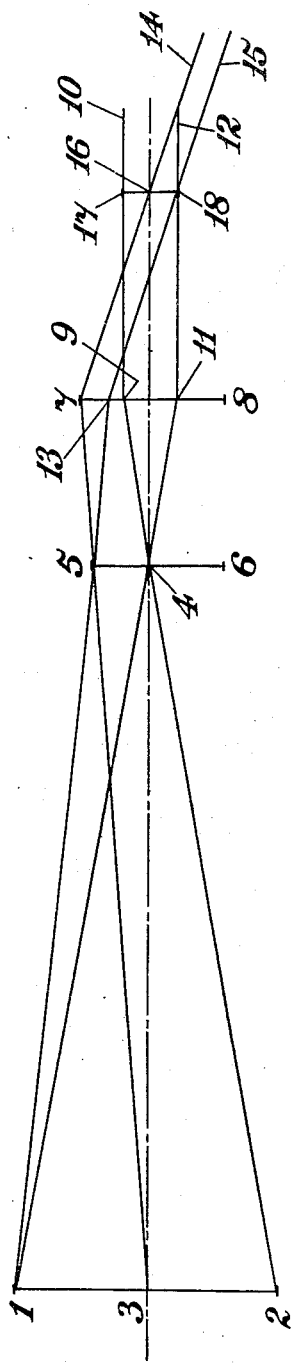
Inventor
James W. French
By Young, Emery & Thompson
Attys.

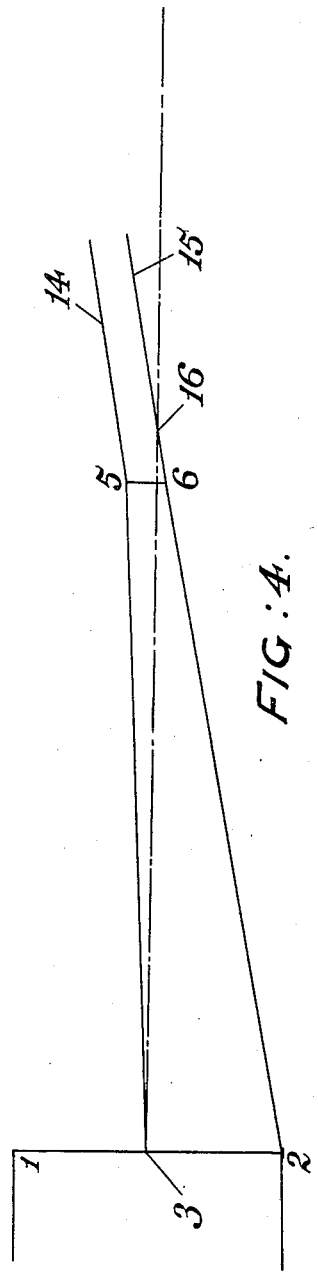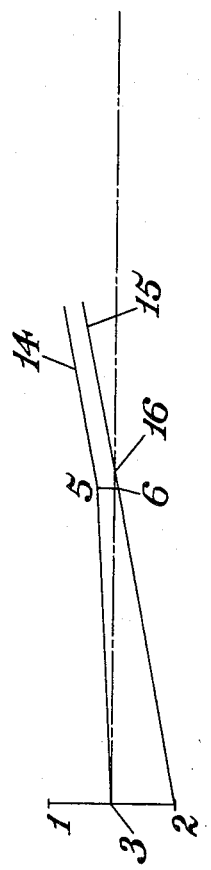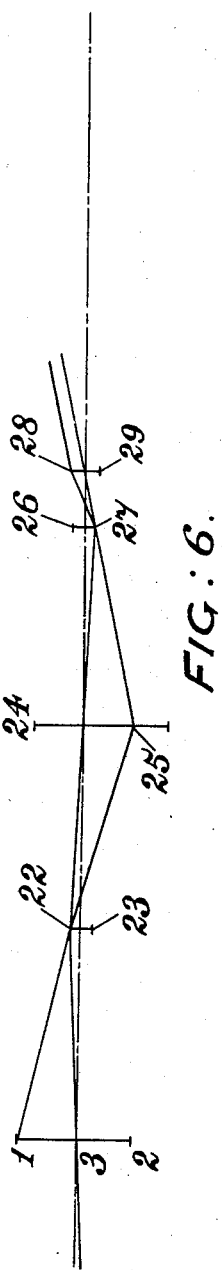

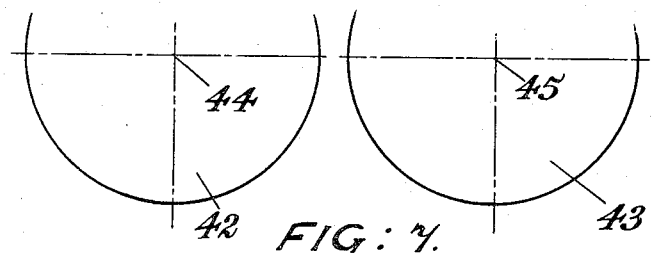
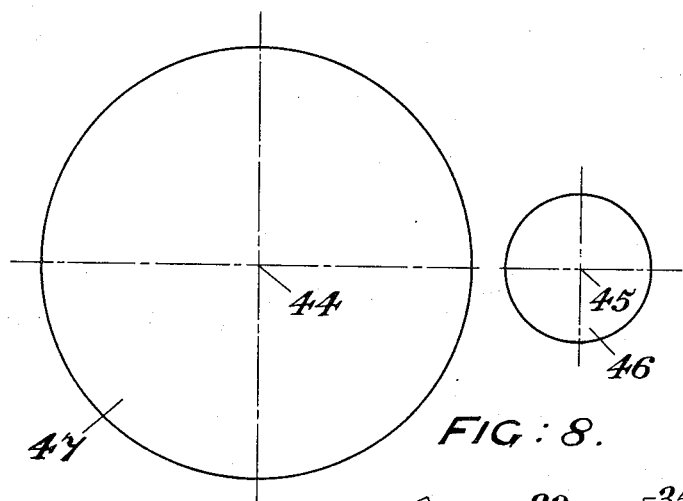
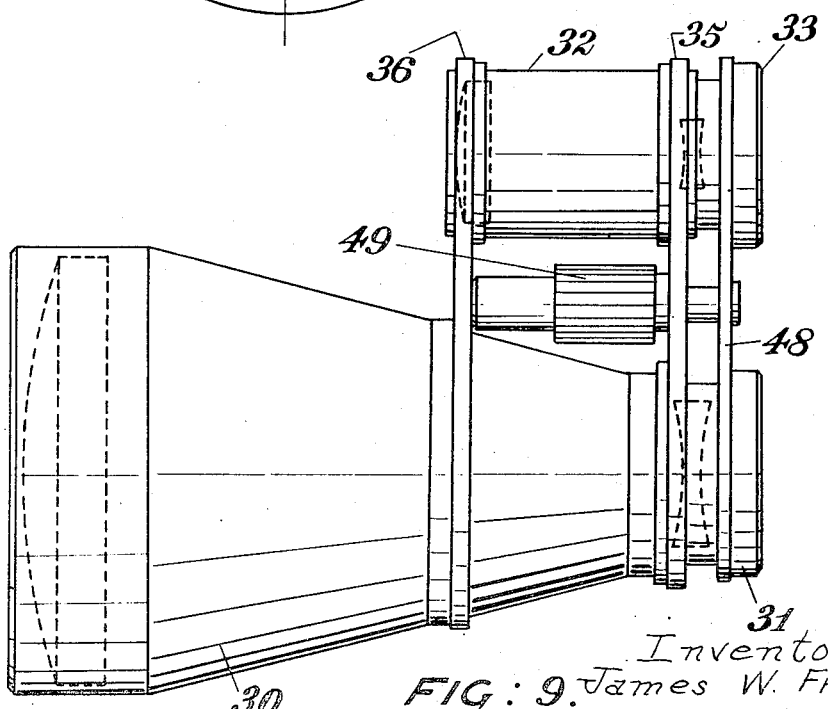

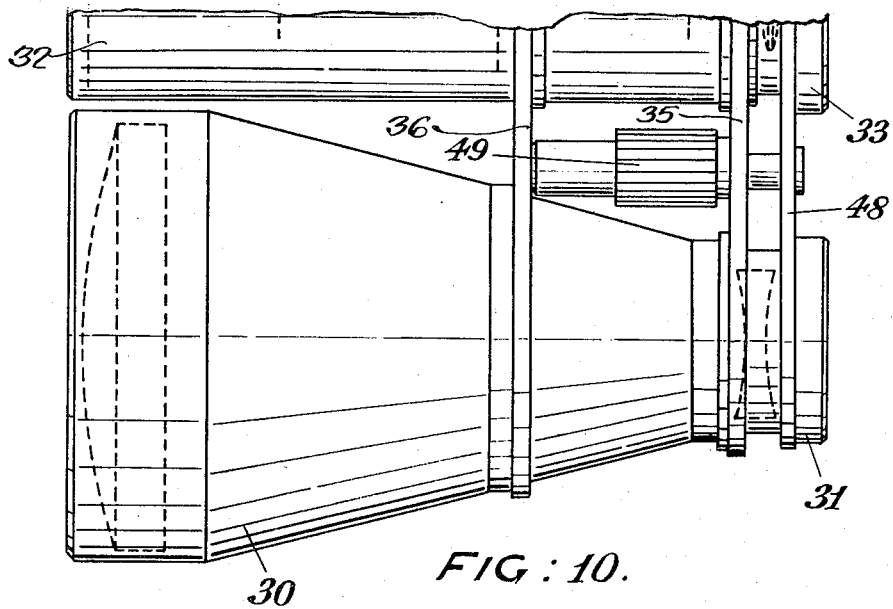
FIG: 10.
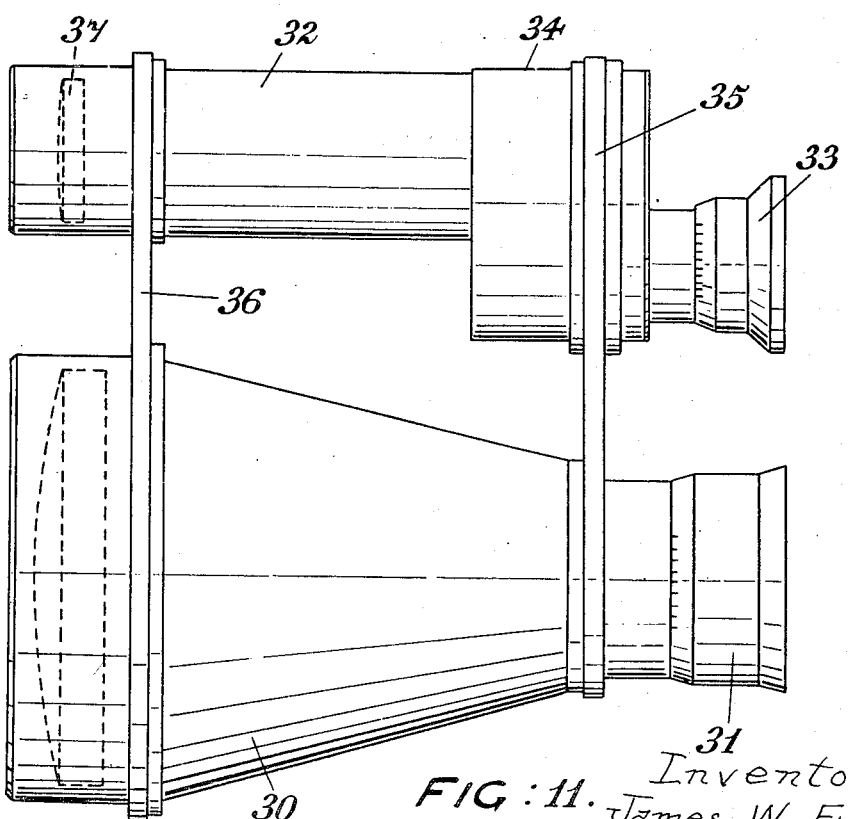
FIG: 11.
Inventor
James W. French
By Young, Evans, Thompson Attys.

Dec. 8, 1953  J. W. FRENCH  2,661,657
BINOCULAR OBSERVATION INSTRUMENT
Filed Aug. 15, 1947  5 Sheets-Sheet 5
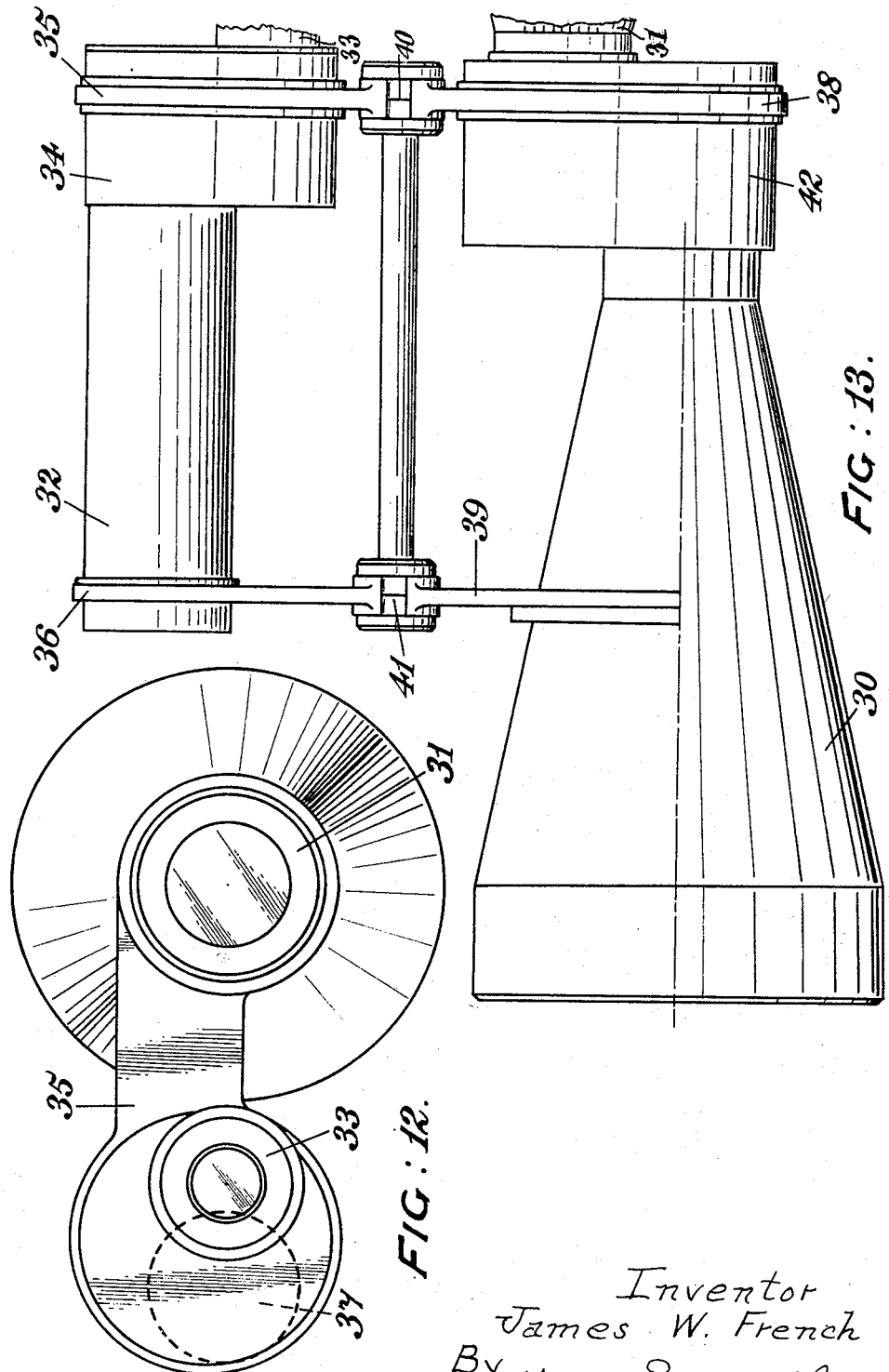
Inventor
James W. French
By Young, Emery & Thompson
Attys.

Patented Dec. 8, 1953

2,661,657

UNITED STATES PATENT OFFICE 2,661,657

BINOCULAR OBSERVATION INSTRUMENT

James Weir French, Glasgow, Scotland, assignor to Barr & Stroud, Limited, Glasgow, Scotland, a British company Application August 15, 1947, Serial No. 768,722
Claims priority, application Great Britain
September 25, 1946

8 Claims. (Cl. 88—34)

This invention relates to binocular observation instruments of the type in which the images from the two limbs of the instrument, formed on the two retinas of the observer, are combined in the brain to form a single image. Our invention will, however, be described for purpose of illustration, with particular reference to what is commonly known as a field glass, or binocular, although it is applicable to other binocular instruments such as stereo rangefinders.

When observation is made with the one eye and then with two, the appreciation of the illumination by the brain is increased to the extent of about ten or fifteen per cent. Binoculars hitherto have been constructed with both limbs of the same optical size and in general identical, apart from being sometimes right and left handed, as in the case of prism binoculars.

In accordance with the present invention we provide a binocular observation instrument of the type in which the images from the two limbs of the instrument, formed on the two retinas of the observer, are combined in the brain to form a single image, characterised by the daylight aperture of one binocular limb being substantially smaller than that of the other.

As a result of the invention, one limb of the binocular can be made optically as large as may be necessary to provide the desired illumination and optical qualities, while the optical size of the other limb can be reduced substantially without proportional reduction to any important extent of apparent illumination, without loss of stereoscopic effect, and in some cases with improved definition and contrast; and further, the daylight aperture of one objective can be increased, and therefore the illumination, beyond what is possible in, for example, a Galilean binocular.

Table 1, compiled from the results of a typical experiment, shows the effect of reducing the objective area of one limb of a binocular, having in the other limb an objective of 3 square inches constant daylight aperture.

Provided the two eyes of the observer are reasonably equal, it is immaterial which limb, either right or left, of the binocular is reduced. Experiment shows that in the case of a normal observer the differences are negligible, but for comfort in the case of a hand held binocular the larger and heavier limb might with advantage be the right hand one.

Table 1

| | 1 | 2 | 3 | 4 | 5 | 6 |
|---|---|---|---|---|---|---|
| | Objective Area of Large Limb, percent | Objective Area of Small Limb, percent | Reduction of Total Apparent Illumination | Stereoscopic Effect | Definition | Contrast |
| A | 100 | 59 | Very slight | Unaltered | Improved | |
| B | 100 | 26 | Less than 5% | do | do | Improved. |
| C | 100 | 7 | Less than 10% | do | do | Do. |
| D | 100 | 1.7 | Less than 15% | do | Same as Line C | Slightly worse than line C. |
| E | 100 | zero | About 15% | Impaired | Impaired | Impaired. |

Table 1 shows a set of such readings taken with a binocular having an objective of 3 square inches daylight area represented in column 1 of the table, as 100%. The other limb of the objective was progressively reduced in area from 100% to 59% then 26%, 7%, 1.7% and finally zero, as indicated in column 2. Reduction to 59%, line A, produced only a very slight reduction of the total apparent illumination. Stereoscopic effect, column 4, remained unaltered. Definition, column 5, was slightly improved. No change of contrast, column 6, was observable.

When the units were reduced to 26% line C, there was a small apparent reduction of total illumination, less than 5%. Stereoscopic effect was unaltered. Both definition and contrast were improved.

A further reduction to 7%, line C, resulted in a reduction of the total apparent illumination by less than 10%. Stereoscopic effect was unaltered. There was a slight further improvement in definition and contrast.

Reduction of the objective area to 1.7% caused a total reduction of apparent illumination of less than 15%. Stereoscopic effect was still unaltered. The definition was as in line C. Contrast was slightly less than in line C.

When the objective area was reduced to zero, line E, the illumination was not reduced by more than 15% as compared with the total illumination when both objectives were of full aperture. The stereoscopic effect was impaired owing to the elimination of the stereoscopic base. Any residual stereoscopic appearance may be attributed to judgement other than real stereoscopic effect. Both the definition and the contrast were impaired as compared with the binocular having full aperture in both objectives.

These results indicate that in the use of a binocular having full aperture in both objectives, as compared with a monocular of the same objective aperture, the brain appreciates about 15% more light. When the area of one objective is progressively decreased, there is a progressive loss of illumination within the limit of 15%. This apparent binocular increase of illumination explains the appearance of movement towards the observer and increased size of a target under observation when a sudden change is made from monocular vision to binocular. The greater illumination at once creates the impression of greater nearness and size. The true stereoscopic effect is not lost so long as sufficient direction of both eyes is provided.

The data indicated in Table 1 were obtained under normal daylight conditions. Similar results were, however, obtained over a large range of light intensity. To illustrate this feature, the neutral filters which transmitted only 6% of the incident light were placed over both objectives. Thereafter the area of one of the objectives was progressively diminished in steps by the amounts indicated in Table 1.

reference to the accompanying drawings, whose figures illustrate as follows:

Figure 1, the dioptric system of a terrestrial type glass.

Figure 2, the dioptric system of a Galilean glass with the eye centrally placed.

Figure 3, the same dioptric system with the eye displaced.

Figure 4, the oblique rays of Figure 2.

Figure 5, the oblique rays of a Galilean system with reduced objective and same angular field as Figure 4.

Figure 6, a terrestrial system having a reduced objective and the same angular field as the Galilean system, Figure 4.

Figure 7, the largest size of Galilean objectives obtainable for the average interocular distance.

Figure 8, the greatly increased diameter objective of one limb in comparison with reduced diameter of the other, the interocular distance being as in Figure 7.

Figure 9, a binocular having one Galilean limb large and the other Galilean limb small.

Figure 10, a binocular having one large Galilean limb and another small objective limb comprising a terrestrial system of lenses.

Fig. 11, a binocular with one large Galilean limb and a small prismatic telescope limb.

Figure 12, the eyepiece view of Figure 11.

Figure 13, a binocular having both limbs of the prismatic type, one large and the other small.

In the case of an optical system having a field viewed by an eyepiece, reduction of the objective diameter does not reduce the angular field of observation as will be seen from Figure 1, which

*Table 2*

| | 1 | 2 | 3 | 4 | 5 | 6 |
|---|---|---|---|---|---|---|
| | Objective Area of Large Limb, percent | Objective Area of Small Limb, percent | Reduction of Total Apparent Illumination | Stereoscopic effect | Definition | Contrast |
| A | 100 | 59 | Very slight loss | Unaltered | Slightly improved | Slightly improved. |
| B | 100 | 26 | Slight loss | do | Improved | Improved. |
| C | 100 | 7 | Less than 5% | do | As in line B | As in line B. |
| D | 100 | 1.7 | Less than 10% | do | do | Do. |
| E | 100 | zero | do | Impaired | Impaired | Impaired. |

The results for such very dull light condition, indicated in Table 2, are very similar to those of Table 1. There was no apparent loss of light until the illumination of one limb had been reduced to about 59%. Stereoscopic vision was unaffected. There was initially an improvement in definition and contrast which continued unchanged till near the end. At 1.7% and zero aperture the loss approached 10%. It would appear, therefore, that compared with the monocular in failing light, the binocular appears to give about 10% more illumination.

It will be evident from these two tables that a large reduction of one object glass may be effected with advantage and without any serious loss of total illumination. As is customary the magnifying power of the two limbs should be the same and also the angular fields or otherwise the superposition of the dark rim of the smaller field upon the illuminated margin of the other is disturbing to the observer.

Having now described the general optical principles of the two main types of binoculars commonly called Galilean and prismatic, we shall now describe this invention, by way of example, with represents the limiting rays of a central and oblique beam of light entering the objective 1, 2, whose optical centre is 3. Marginal rays of the parallel beam converge to the centre 4 of the field 5, 6, whence they proceed to the eyelens 7, 8, and emerge parallel along the directions 9, 10 and 11, 12. The oblique ray 3, 5 determines the semi-angular field of the system.

It is customary in such instruments to provide only half, or even less, light at the side of the field. In any radial plane the limiting rays 1, 5 and 3, 5, to the margin 5 of the diaphragm 5, 6, therefore determine the amount of illumination that will be apparent at the field margin. These two rays pass to the eyelens 7, 8 in the directions 5, 7 and 5, 13 and emerge from the eyelens as parallel rays in the directions 7, 14 and 13, 15. The central oblique ray 3, 7, after passing through the system, intersects the axis at the point 16 which is termed the position of the exit pupil 17, 18. The eye placed at this position receives the whole of the light from the objective entering parallel to the axis and the whole of the oblique light, in this case corresponding with half of the objective area.

From this diagram it will be seen that the semi-angular field is determined by the obliquity of the line 3, 5, that it is not decreased by reduction of the objective, and that it can only be increased by enlargement of the diaphragm 5, 6. A displacement of the eye in the plane of the exit pupil 17, 18 cuts off light from the central beam and in one direction in the half light arrangement indicated also from the oblique beam.

In the particular arrangement, Figure 1, a prism system for the erection of the image is not indicated as it does not affect the field provided the prisms are sufficiently large.

In the case of a Galilean type of glass, as represented in Figures 2 and 3, the conditions are quite different. A Galilean glass comprises a positive objective and a negative eyelens. There can be no positive field diaphragm such as 7, 8 of Figure 1, the objective field lies beyond the eyelens, not between it and the objective. It is then the margin of the objective that determines the field which, however, does not appear distinct as it is not in the focus of the eyepiece as is the case with the field diaphragm of the binocular, Figure 1.

In Figure 2, 1, 2, 3 represents the objective; 7, 8 the negative eyelens. Rays 1, 7 and 2, 8 of the axial beam of light that is entering parallel to the axis pass to the eye in the parallel directions 7, 9 and 8, 11. For illumination of 50% at the edge of the field the limiting oblique rays are 3, 5 and 2, 6. These rays pass outwards in the parallel directions 5, 14 and 6, 15. There is no exit pupil position as in the case of Figure 1. If, however, the eye is placed at the position 16, then the iris 17, 18 will receive all the light of the parallel beam and all the light of the oblique beam without any translation of the head.

If the head were translated sideways, as explained in connection with Figure 1, there would be cutting off of some light but the movement of the eye would enable a larger angular field at one side to be observed, as indicated in Figure 3, where the iris 17, 18 has been displaced sufficiently to cut off half the central beam. The limiting oblique ray is now 3, 20 and is of larger angular value than 3, 7 of Figure 2. There has been an increase of angular field at the expense of central illumination and oblique illumination at one side. The eyelens 20, 21 must necessarily be increased to suit the wider beam.

In a Galilean glass the angular field is determined by the aperture of the objective, and if movement of the head is permissible, to some extent by the size of the eyelens. If one objective of a Galilean glass is reduced in diameter, the angular field of the particular limb is also reduced. The brain, therefore, perceives an illuminated area corresponding with the angular field of the larger limb and superposed upon it a similar area corresponding, however, with the reduced field of the smaller objective.

In Figure 4, the oblique rays of the Galilean system Figure 2, are represented for comparison with Figures 5 and 6 in order to indicate how the angular field may be made equal to that of the large objective limb. In Figure 4, 1, 2, 3 is the objective of the Galilean system; 5, 6 is the portion of the negative lens through which the oblique rays pass; 3, 5 and 2, 6 are the oblique rays within the limb, while 5, 14 and 6, 15 are the parallel rays entering the eye which may be most conveniently situated at the position 16.

In Figure 5 the objective has been reduced to half the size and its focal length correspondingly reduced, with the result that the oblique rays 2, 6 in both figures are parallel to one another and the angular fields equal.

In Figure 6 the dioptric system is of the terrestrial telescope type in which the objective is represented by 1, 2, 3 its focal plane being at the position 22, 23. An image of this focal plane is transferred to the position 26, 27 by means of the projector lens 24. The eyepiece 28, 29 views the field 26, 27. By suitable adjustment of the field diameter 22, 23, the angular field may be made equal to that of the larger objective limb.

Figure 7 represents the equal diameter objectives 42 and 43 customarily used in a Galilean binocular. Their diameter is determined by the separation of the centres 44 and 45 equal to the interocular distance of the observer. The small space between the objectives is allowed for the thickness of the objective holders. In a Galilean glass there is, therefore, a limit to the objective diameter and therefore to the illumination and night visibility.

In Figure 8, 46 represents the small objective and 47 the large objective of a binocular constructed in accordance with this invention, separation of the centres 44, 45 being equal to the interocular distance. Owing to the smallness of the daylight aperture at 46 the diameter of the daylight aperture at 47 is much increased beyond what has hitherto been possible in a Galilean glass.

Figure 9 represents a binocular having both limbs of the Galilean type, the limb 30 having a large objective and the other limb 32 a small objective. Both limbs are connected together in the usual way by the arms 35, and 36. In this particular example the focussing device is of a well known type, the eyepieces 31 and 32 being carried upon an arm 48 which can be moved in or out to suit the focussing by means of the focussing head 49.

Figure 10 is another arrangement similar to Figure 9 and in which the same references indicate like parts, but in this case the smaller limb 32 comprising a terrestrial optical system, the objectives being more or less in the same plane instead of one behind the other as in Figure 9.

Figure 11 represents a binocular constructed in accordance with this invention having a limb 30 of the Galilean type suitable for an objective whose diameter is greater than that of the interocular distance. The other limb 32 is of the prismatic type having an objective 37 substantially smaller than the objective of the larger limb and having erecting prisms contained within the prism box 34, the field being viewed by the eyepiece 33. The limbs may be connected by the arms 35 and 36. The magnifying powers and angular fields of the two binocular limbs are equal.

Figure 12 is a front view (inverted) of Figure 11 showing the eyepiece 31 of the larger limb and 33 of the smaller with the connecting arm 35.

Figure 13 is another arrangement of limbs in accordance with this invention, both limbs being of the prismatic type, one (30) having a large objective, the other (32) a small objective, with the angular fields in both cases equal. The prisms of the respective sets are contained in the boxes 34 and 42. In this particular example the limbs are hinged at the joints 40 and 41 the connecting arms being 35, 36, 38 and 39.

Although the daylight apertures at 46 and 47 (Figure 8) are shown circular they may instead be of some other form, for example rectangular.

I claim:

1. A binocular stereoscopic observation instrument for increasing the apparent illumination having two side-by-side optical limbs relatively positioned for two-eyed viewing by an observer and each including an optical telescope system with an objective lens and an eyepiece lens; the diameters of the objective lens and of the light entry aperture thereto of one limb being substantially equal but radically larger than these diameters of the other limb, and including means for producing the same angular field of view in the optical system of each limb whereby the total objective light entry area to the interior of the instrument is greater than in the case where the objective lenses are of equal size.

2. A binocular stereoscopic observation instrument for increasing the apparent illumination having two side-by-side optical limbs relatively positioned for two-eyed viewing by an observer and each including an optical telescope system with an objective lens and an eyepiece lens; the diameters of the objective lens and of the light entry aperture thereto of one limb being substantially equal but radically larger than these diameters of the other limb, and including means for producing the same angular field of view in the optical system of each limb and presenting at the two eyepiece lenses, aligned and equally magnified similar views of a common distant object on which the instrument is focussed by the observer whereby the total objective light entry area to the interior of the instrument is greater than in the case where the objective lenses are of equal size.

3. A binocular stereoscopic observation instrument comprising a first and second optical limb of the Galilean type arranged side-by-side with their longitudinal axes spaced apart by the limiting interocular distance and each including an optical telescope system having a circular objective lens and an eyepiece lens respectively located adjacent the opposed ends of the limb, the objective lens of the first limb being of radius radically greater than half the limiting interocular distance, and the objective lens of the second limb being of radius radically smaller than half the interocular distance and equal to the interocular distance less the radius of the objective lens of the first limb and less structural clearance, whereby the total objective light entry area to the interior of the instrument is greater than in the case where the objective lenses are of equal size, the focal length of the smaller objective lens being of correspondingly smaller length than that of the larger objective lens and said limbs being of such length as is necessary to provide equal angular fields of view, the optical systems of the two limbs presenting at the two eyepiece lenses, for transmission to the brain of the observer to be combined therein, aligned and equally magnified similar views of images of a common distant object on which the instrument is focussed by the observer.

4. A binocular stereoscopic observation instrument as claimed in claim 3, in which the first limb is radically greater in lateral dimension than the second limb in correspondance with the diametral sizes of the objective lenses carried by the limbs.

5. A binocular comprising two side-by-side optical limbs, one of the Galilean type and the other of the terrestrial prismless type, inter-related for simultaneous two-eyed viewing by an observer and each including an optical telescope system having a circular objective lens and an eyepiece lens, the diameters of the objective lens and the light entry aperture of each limb being substantially equal, the diameter of the objective lens in the terrestrial type limb being radically greater than that of the other limb and the optical systems of the two limbs presenting at the two eyepiece lenses for transmission to the brain of the observer to be combined therein, aligned an equally magnified view of the images, of a common distant object on which the instrument is focussed by the observer, and means for producing the same angular field of view in the optical system of each limb whereby the total objective light entry area to the interior of the instrument is greater than in the case where the objective lenses are of equal size.

6. A binocular as claimed in claim 5, in which the diameter of the field in the focal plane of the terrestrial prismless type limb is adjusted to provide an angular field equal to that of the other limb.

7. A binocular stereoscopic observation instrument as claimed in claim 1, in which one limb is of the Galilean type and the other of the prismatic type.

8. A binocular stereoscopic observation instrument as claimed in claim 2, in which one limb is of the Galilean type and the other of the prismatic type.

JAMES WEIR FRENCH.

References Cited in the file of this patent

UNITED STATES PATENTS

| Number | Name | Date |
|---|---|---|
| 569,528 | Toussaint | Oct. 13, 1896 |
| 804,996 | Anthony | Nov. 21, 1905 |
| 841,262 | Martin | Jan. 15, 1907 |
| 1,714,849 | Daponte | May 28, 1929 |
| 1,891,641 | Habel | Dec. 20, 1932 |
| 2,166,102 | Wild | July 18, 1939 |
| 2,406,190 | Burdick | Aug. 20, 1946 |

FOREIGN PATENTS

| Number | Country | Date |
|---|---|---|
| 10,493 | Great Britain | of 1908 |
| 20,390 | Great Britain | of 1908 |
| 498,167 | France | Oct. 8, 1919 |
| 527,514 | Germany | May 6, 1932 |